Patented Oct. 10, 1939

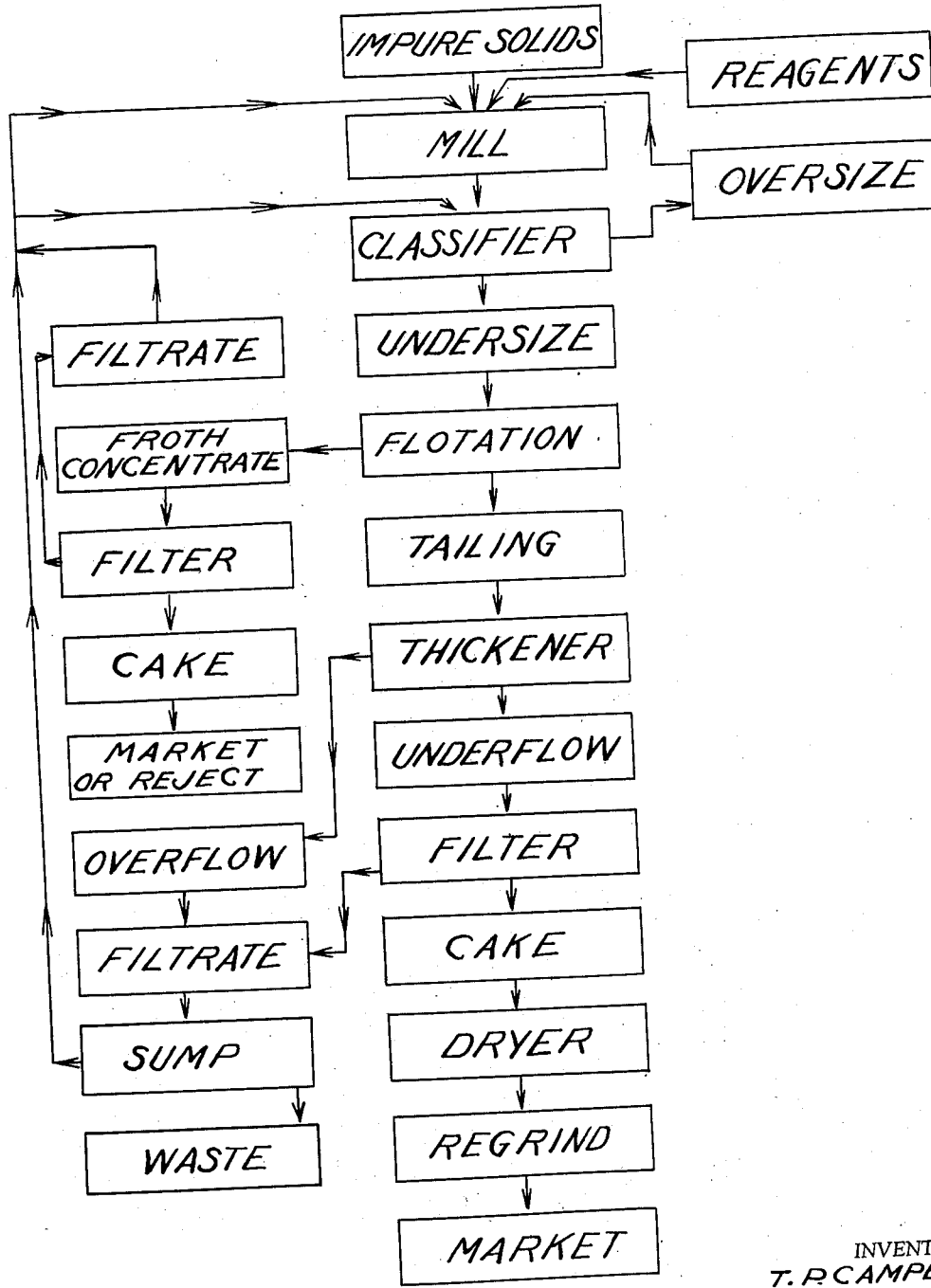

2,175,178

UNITED STATES PATENT OFFICE 2,175,178

PROCESS FOR TREATING SOLUBLE MATERIALS

Thomas P. Campbell, Denver, and William B. Jacobsen, Golden, Colo.

Application November 1, 1935, Serial No. 47,852

18 Claims. (Cl. 209—166)

This invention relates to the purification of readily soluble substances, both of natural and artificial origin, and more particularly relates to a method of separating insoluble constituents of water soluble compositions and the like.

Many readily (water) soluble substances occur in nature in a more or less impure state, and removal of one or more of the constituent impurities is necessary to adapt the naturally-occurring substance for use in commerce. These impurities usually include one or more insoluble or difficultly-soluble constituents and/or one or more soluble constituents other than the material to be purified.

The present invention does not deal with the separation of the various soluble constituents in the material under treatment. In most cases, the material to be treated will contain predominant quantities of a soluble substance to be adapted for commerce and minor quantities of at least one other soluble material, in addition to insoluble constituents. Removal of the insoluble matter will normally satisfy commercial requirements, and no separation of the soluble constituents is necessary.

Where separation of the soluble substances is required, such separation can be effected by any well known methods after the insoluble matter has been initially removed by the present method.

It is an object of the present invention to provide a method of effecting a clean separation of insoluble constituents from soluble constituents of a water-soluble material.

Another object of the invention resides in the separation of insoluble matter from natural or artificial material with which it is mingled, by a froth-flotation treatment.

A further object of the invention is to provide a simple, efficient and inexpensive method of purifying soluble compositions such as native salt, either rock salt or evaporated salt, native borax, bi-product chloride of lime, and the like.

Still another object resides in a control of circuit water employed in a refining process to maintain the same in proper condition for effective treatment.

A still further object of the invention is the provision of a method of refining soluble materials which is effective for either a batch, or a continuous operation.

Other objects reside in novel steps and processes as will more fully appear in the course of the following description.

The refining operation involves a separation of insoluble constituents from soluble constituents by froth floating the same in a saturated or substantially saturated solution of at least one of the soluble constituents, or some other readily soluble substance which will prevent the soluble constituents in the material from entering into solution.

Utilizing froth flotation in the treatment of readily soluble materials is of rather recent origin, but has been disclosed in the United States patent to Nessler No. 1,967,897 of July 24, 1934, in which the separation of mixtures of alkali metal nitrates with ammonium chloride by froth-flotation has been described. Also, recent developments of froth-flotation separation of potassium chloride from sodium chloride in ores containing these minerals, have proven successful.

All these treatments involve the suspension of the material under treatment in a saturated solution of the same or substantially the same material. Thereafter a separation of one soluble constituent from a second soluble constituent is effected by collecting and floating one of these soluble substances.

The present method differs from the foregoing in that all soluble constituents are maintained in a depressed or non-floated condition in the liquid body being subjected to the froth-flotation treatment, while substantially all the insoluble impurities are floated and collected in a froth for subsequent removal by overflow or otherwise.

The insoluble constituents are usually present in relatively minor amounts, in the solid phase, and when subjected to aeration and/or agitation in the presence of a suitable reagent having a preferential affinity for such material, they will be elevated by the ascending air bubbles, and collected in a froth on the surface of the liquid body.

The reagents of the process may be frothers, collectors, activators, inhibitors and the like. The particular reagent or combination of reagents to be used will vary with variations in the composition and quality of the material under treatment.

Flotation agents particularly effective are soaps and fatty acids, or a combination of the two. Soaps formed of sodium salts of a fatty acid, such as crude sodium oleate, sodium stearate and sodium palmitate are particularly efficacious.

Fatty acids particularly well adapted for the treatment are oleic acid, lauric acid and capric acid.

In certain treatments better results are obtained when the soluble composition being purified is subjected to the action of an inhibitor or depressing agent. Sodium silicate, any alkali cyanide, and lime (CaO) are effective for this purpose.

The amount of reagent to be used in the treatment varies with differences in properties of each material treated. Good flotation results are obtained by using from a trace to 0.5 of a pound of reagent per ton of material treated. Care should be taken that too much reagent is not used, as the soluble constituents will be floated with the insoluble material whenever too much reagent is present in the pulp.

The froth-floating operation is of comparatively short duration, from ten to fifteen minutes usually being required. The color of the froth provides a good indicator, and when dirty material ceases to come up into the froth, the separation is substantially complete.

In preparing the material for the froth flotation operation, certain conditioning steps and auxiliary processes are necessary. The solids initially must be "unlocked" or freed of any crystalline or mechanical attachment to each other. This is best accomplished by grinding, either wet or dry, to some predetermined grain size or average screen-size, and may or may not include screening or classification for control of grain size in the comminuted product.

In this connection, it is to be understood that the essentiality of this preliminary treatment is that the material be in a finely-divided condition for introduction into a liquid carrier before being subjected to flotation, and any means of effecting this result will satisfy the requirements.

If wet grinding is employed, the liquid phase preferably consists of a saturated solution of the material under treatment. The ground product in liquid suspension is introduced into any suitable type of mechanical or pneumatic flotation machine and subjected to aeration and/or agitation. The pulp should be of predetermined density and where continuous feed and discharge is employed, the density of the pulp feed can be controlled to maintain the desired density of the machine.

The flotation reagent or reagents may be added in the flotation machine, or where wet-grinding is employed, the reagent may be introduced in the mill or grinding circuit.

The final stage of the treatment involves the separation of solids from liquid in both the froth and tailing products of the flotation operation. This is most readily accomplished by means of settlers or thickeners and/or filters.

The saturated solution is preferably drawn off and recirculated. Some difficulty is encountered in this operation, due to the fact that repeated usage of the saturated solution may result in a souring or decomposition. To prevent this occurrence, a portion of the liquid may be drawn off and replaced by fresh solution.

Finally, means may be required to dry, regrind or otherwise prepare for market, sale, or other disposal, either or both products of the flotation operation.

These auxiliary steps and processes will be subject to considerable variation in arrangement and equipment, due to variations in the material under treatment and the facilities and requirements of the mills in which the treatment is performed.

In order to illustrate a workable arrangement, reference is made to the accompanying drawing in which a schematic flow sheet sets forth the general procedure, and sequence of operations in carrying out the method of treatment.

As an example of the application of the process, the treatment of a certain rock salt (NaCl) containing 2.2% by weight of insoluble impurities will be explained in connection with the flow sheet. The insoluble materials consist, for the most part, of clay, shale, calcite and gypsum.

The impure salt is first ground to pass a standard 65-mesh screen in order that the impurities may be unlocked and freed from all attachments or combinations to or with the soluble crystalline constituents of the salt.

Closed circuit classification has been illustrated in the flow sheet, in which the oversize is returned to the mill for re-grinding. It is to be understood that open circuit grinding may be employed when conditions favor the same, and if material of desired fineness can be otherwise obtained, classification and/or grinding may be eliminated.

The undersize of the classification, which consists of fines in liquid suspension of a predetermined density is mixed with about four times its weight of saturated brine (NaCl) solution, and constitutes the pulp of the flotation treatment.

The quantities of reagents required in this particular case are substantially 0.08 pound per ton of impure salt treated, the reagents consisting of oleic acid and sodium oleate in approximately equal parts.

The pulp is subjected to agitation and aeration, and a froth containing substantially all of the insoluble substances originally present in the impure salt, collects on the surface where it is subsequently skimmed off.

Some salt (NaCl) may be present in the froth, but by observing the color of the froth, the amount can be held quite readily to not exceed a few per cent of the weight of the impure salt treated.

This operation requires only a short time, fifteen minutes or less, and during and at the conclusion of the same, the froth is skimmed off, after which the remaining pulp is drained from the machine, as a tailing, and conducted to a thickener or other settling apparatus.

The solids or underflow of the thickener operation are thereafter conducted to a filter, formed in a cake, subjected to a drying action, and then re-ground, preferably in a dry operation, after which they are in condition for marketing. The purified salt thus obtained contains less than 0.3% insoluble impurities.

The froth concentrate of flotation is likewise subjected to further treatment, being first filtered. The filtrate from this operation and the filtrate from the filter of the NaCl de-watering are returned to the liquid grinding and flotation circuit. If desired, they may be first conducted to a sump or other storage, from which small amounts are "bled off" and conducted to waste. Fresh saturated solution is added to make up for the loss from the circuit of the quantity "bled off" and otherwise removed or lost, so that the circulating solution is always in a condition for effective results.

The material in the sump is recirculated by pumping or otherwise, and again becomes the saturated solution of the flotation operation.

From the foregoing it will be readily understood that the method may be employed effectively, wherever it is desired to separate insoluble constituents from a mixture of soluble substances, whether of natural or artificial formation.

Likewise, while particular apparatus has been mentioned as employed in the treatment, it is to be understood that any means of performing the various steps and methods may be employed.

Changes and modifications of the various steps and processes may be resorted to within the spirit and scope of the invention as defined in the hereunto appended claims.

Having described the invention, what is claimed as new is:

1. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of sodium oleate in an amount from a trace to 0.5 pound per ton of material treated, while retarding flotation of the solid but soluble constituents of the composition by the action of a quantity of sodium silicate sufficient to exert a depressing action on the said solid constituents in the saturated solution.

2. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of oleic acid in an amount from a trace to 0.5 pound per ton of material treated, while retarding flotation of the solid but soluble constituents of the composition by the action of a quantity of sodium silicate sufficient to exert a depressing action on the said solid constituents in the saturated solution.

3. The process of purifying native rock salt compositions containing a minor percentage of insoluble earthy constituents as impurities thereof, which comprises introducing such a composition in finely-divided condition into a water solution saturated wth the composition to form a pulp, and collecting such insoluble impurities in a froth in a froth flotation treatment without material change in temperature by the action of a mixture of sodium oleate and oleic acid in an amount from a trace to 0.5 pound per ton of material treated, while retarding flotation of the solid but soluble constituents of the composition by the action of a quantity of sodium silicate sufficient to exert a depressing action on the said solid constituents in the saturated solution.

4. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a fatty acid in an amount from a trace to 0.5 pound per ton of material treated, while retarding flotation of the solid but soluble constituents of the composition by the action of a quantity of sodium silicate sufficient to exert a depressing action on the said solid constituents in the saturated solution.

5. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a soap formed of sodium salts of a fatty acid in an amount from a trace to 0.5 pound per ton of material treated, while retarding flotation of the solid but soluble constituents of the composition by the action of a quantity of sodium silicate sufficient to exert a depressing action thereon on the said solid constituents in the saturated solution.

6. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a mixture of a soap and a fatty acid in an amount from a trace to 0.5 pound per ton of material treated, while retarding flotation of the solid but soluble constituents of the composition by the action of a quantity of sodium silicate sufficient to exert a depressing action on the said solid constituents in the saturated solution.

7. The process according to claim 6 in which the pulp comprises approximately one part solids and four parts saturated solution.

8. The process according to claim 6 in which the pulp residue of flotation is subjected to dewatering.

9. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a mixture of a fatty acid and a sodium soap in an amount from a trace to 0.5 pound per ton of material treated, while retarding flotation of in the solid but soluble constituents of the composition by the action of a quantity of sodium silicate sufficient to exert a depressing action on the said solid constituents in the saturated solution.

10. The process of purifying native rock salt compositions and the like containing a minor percentage of insoluble gangue matter as impurities thereof, which comprises grinding the native salt, wetting the ground product to produce a pulp containing the salt in liquid and solid phases as a pulp constituent, collecting the gangue impurities in a froth in a froth flotation treatment without material change in temperature by the action of a mixture of a fatty acid and a soap, while retarding the flotation of the solid but soluble constituents of the pulp by the action of a quantity of sodium silicate sufficient to exert a depressing action on the said solid constituents in the saturated solution, recovering the salt particles as a non-floated residue of flotation, and then dewatering the non-floated residue.

11. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of sodium oleate in an amount from a trace to 0.5 pound per ton of material treated, while retarding flotation of the solid but soluble constituents of the composition by the action of a quantity of lime sufficient to exert a depressing action on the said solid constituents in the saturated solution.

12. The process of purifying native rock salt compositions containing a minor percentage of insoluble earthy constituents as impurites thereof, which comprises introducing such a composition in finely-divided condition into a water solution saturated with the composition to form a pulp, and collecting such insoluble impurities in a froth in a froth flotation treatment without material change in temperature, by the action of oleic acid in an amount from a trace to 0.5 pound per ton of material treated, while retarding flotation of the solid but soluble constituents of the composition by the action of a quantity of lime sufficient to exert a depressing action on the said solid constituents in the saturated solution.

13. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a mixture of a soap and a fatty acid in an amount from a trace to 0.5 pound per ton of material treated, while retarding flotation of the solid but soluble constituents of the composition by the action of a quantity of lime sufficient to exert a depressing action on the said solid constituents in the saturated solution.

14. The process of purifying native rock salt compositions containing a minor percentage of insoluble earthy constituents as impurities thereof, which comprises introducing such a composition in finely-divided condition into a water solution saturated with the composition to form a pulp, and collecting such insoluble impurities in a froth in a froth flotation treatment without material change in temperature, by the action of a mixture of sodium oleate and oleic acid in an amount from a trace to 0.5 pound per ton of material treated, while retarding flotation of the solid but soluble constituents of the composition by the action of a quantity of lime sufficient to exert a depressing action on the said solid constituents in the saturated solution.

15. The process of purifying compositions of the class characterized by native rock salt, native borax and by-product chloride of lime, said compositions containing a minor percentage of insoluble earthy constituents as impurities thereof, which comprises introducing such a composition in finely-divided condition into a water solution saturated with such composition to form a pulp, and collecting such insoluble impurities in a froth in a froth flotation treatment without material change in temperature, by the action of a mixture of oleic acid and a sodium soap, while retarding flotation of the solid but soluble constituents of the composition by the action of a quantity of sodium silicate sufficient to exert a depressing action on the said solid constituents in the saturated solution.

16. The process of purifying compositions of the class characterized by native rock salt, native borax and by-product chloride of lime, said compositions containing a minor percentage of insoluble earthy constituents as impurities thereof, which comprises introducing such a composition in finely-divided condition into a water solution saturated with such composition to form a pulp, and collecting such insoluble impurities in a froth in a froth flotation treatment without material change in temperature, by the action of a fatty acid composition in an amount from a trace to 0.5 pound per ton of material treated, while retarding flotation of the solid but soluble constituents of the composition by the action of a quantity of a composition of the class consisting of alkali cyanide sodium silicate and lime sufficient to exert a depressing action on the said solid constituents in the saturated solution.

17. The process of treating native borax containing a minor percentage of insoluble constituents, comprising the treatment of the native borax in a saturated solution in which the borax remains in an undissolved state, and subjecting the saturated solution, inclusive of the native borax to a froth-flotation treatment without material change in temperature in the presence of a reagent having a preferential affinity for the insoluble constituents, whereby the insoluble constituents are floated in a froth separate from the native borax.

18. The process of treating bi-product chloride of lime containing a minor percentage of insoluble constituents, comprising the treatment of the chloride of lime in a saturated solution in which the chloride of lime remains in an undissolved state, and subjecting the saturated solution, inclusive of the chloride of lime to a froth-flotation treatment without material change in temperature in the presence of a reagent having a preferential affinity for the insoluble constituents, whereby the insoluble constituents are floated in a froth separate from the undissolved chloride of lime.

THOMAS P. CAMPBELL.
WILLIAM B. JACOBSEN.